(12) United States Patent
Strobl, Jr. et al.

(10) Patent No.: US 7,774,993 B2
(45) Date of Patent: Aug. 17, 2010

(54) ELONGATED EDGING ASSEMBLY

(75) Inventors: Frederick P. Strobl, Jr., McHenry, IL (US); Bradley D. LeGare, Kane, IL (US)

(73) Assignee: Bravo Foxtrot Holdings, Inc., St. Charles, IL (US)

( * ) Notice: Subject to any disclaimer, the term of this patent is extended or adjusted under 35 U.S.C. 154(b) by 0 days.

(21) Appl. No.: 11/543,573

(22) Filed: Oct. 5, 2006

(65) Prior Publication Data
US 2008/0104896 A1 May 8, 2008

(51) Int. Cl.
*E01C 11/22* (2006.01)
(52) U.S. Cl. .............. 52/102; 404/8; 404/7; 47/33
(58) Field of Classification Search ............. 52/102, 52/848, 592.1; 47/33; 404/7, 8; 405/107, 405/110, 114, 282, 284
See application file for complete search history.

(56) References Cited

U.S. PATENT DOCUMENTS

| 113,007 A | 3/1871 | Biehl |
| 456,995 A | 8/1891 | Landis |
| 567,173 A | 9/1896 | Schillinger |
| 2,821,809 A * | 2/1958 | Collien et al. ............ 47/33 |
| 3,916,563 A | 11/1975 | Tedesh |
| 4,831,776 A | 5/1989 | Fritch |
| 4,863,307 A | 9/1989 | Jones |
| 4,969,289 A | 11/1990 | Trifiletti |
| RE33,550 E | 3/1991 | Jones |
| 5,073,061 A | 12/1991 | Jones |
| 5,092,076 A | 3/1992 | Terreta |
| D329,709 S * | 9/1992 | Strobl, Jr. ............ D25/164 |
| 5,168,678 A | 12/1992 | Scott, Jr. et al. |
| D336,220 S | 6/1993 | Grimes |
| 5,240,343 A | 8/1993 | Strobl, Jr. |
| 5,259,154 A * | 11/1993 | Lilley ............... 47/33 |
| 5,375,941 A * | 12/1994 | Strobl, Jr. ............ 404/7 |
| 5,377,447 A | 1/1995 | Fritch |
| 5,666,682 A | 9/1997 | Bonaddio et al. |
| 5,720,128 A * | 2/1998 | Smith et al. ........... 47/33 |
| 5,729,937 A | 3/1998 | Mantelli |
| 5,769,562 A * | 6/1998 | Jones ............... 404/7 |

(Continued)

FOREIGN PATENT DOCUMENTS

DE 198 48 320 A1 5/2000

(Continued)

*Primary Examiner*—Brian E Glessner
*Assistant Examiner*—James J Buckle, Jr.
(74) *Attorney, Agent, or Firm*—Stinson Morrison Hecker LLP

(57) ABSTRACT

An elongated edging assembly for holding landscaping and/or paving materials and the like in place in a predetermined location. The assembly may be made up of first and second elongated edger members which each include an elongated upright material retaining plate and a connector located adjacent an end of the corresponding member. The connectors desirably include respective mating interengageable components located on the plates near the ends thereof. The components are configured and adapted to cooperate to interconnect the members and maintain the ends of the respective plates in substantial abutting relationship with the plates in substantial alignment. The members may ideally be arranged as a neat packet of related objects including a pair of elongated members configured, arranged, aligned and joined together so as to present a single elongated construct having an open interior. At least one accessory item for said members is arranged within the open interior.

31 Claims, 14 Drawing Sheets

U.S. PATENT DOCUMENTS

| | | |
|---|---|---|
| 5,806,249 A | 9/1998 | Helms |
| 5,930,947 A | 8/1999 | Eckhoff et al. |
| 6,012,254 A | 1/2000 | Gaston |
| 6,030,144 A * | 2/2000 | Cannella .................. 404/7 |
| 6,071,038 A * | 6/2000 | Strobl, Jr. ................ 404/7 |
| 6,085,458 A * | 7/2000 | Gau ........................ 47/33 |
| 6,324,783 B1 | 12/2001 | McIntyre et al. |
| 6,354,038 B1 | 3/2002 | Morris |
| 6,379,078 B1 | 4/2002 | Zwier |
| 6,409,421 B1 * | 6/2002 | Jones ...................... 404/7 |
| 6,767,159 B2 | 7/2004 | Jones |
| D516,228 S | 2/2006 | Dunbar |
| 2002/0141819 A1 | 10/2002 | Jones |

FOREIGN PATENT DOCUMENTS

DE       102 30 182 A1      1/2004

* cited by examiner

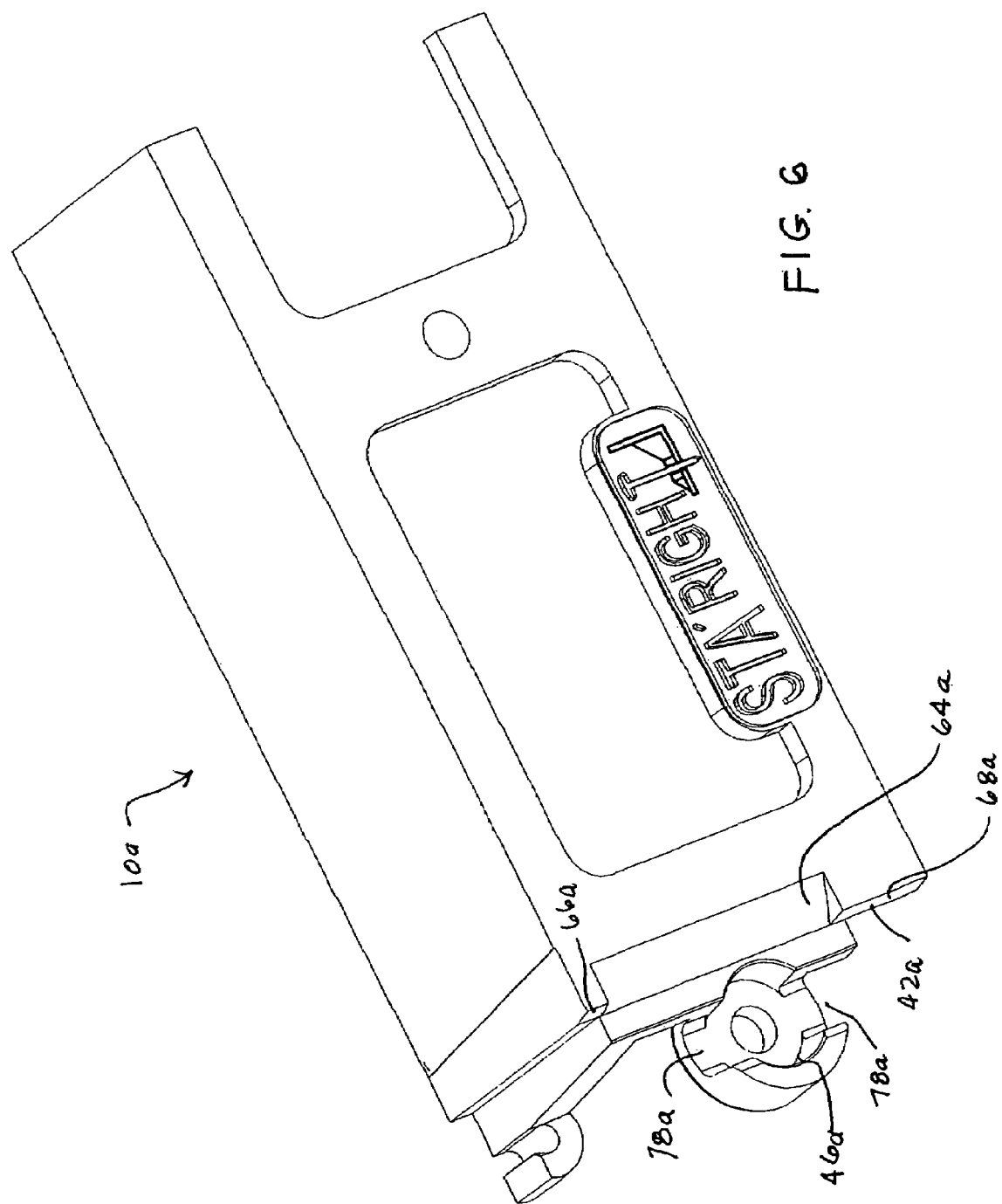

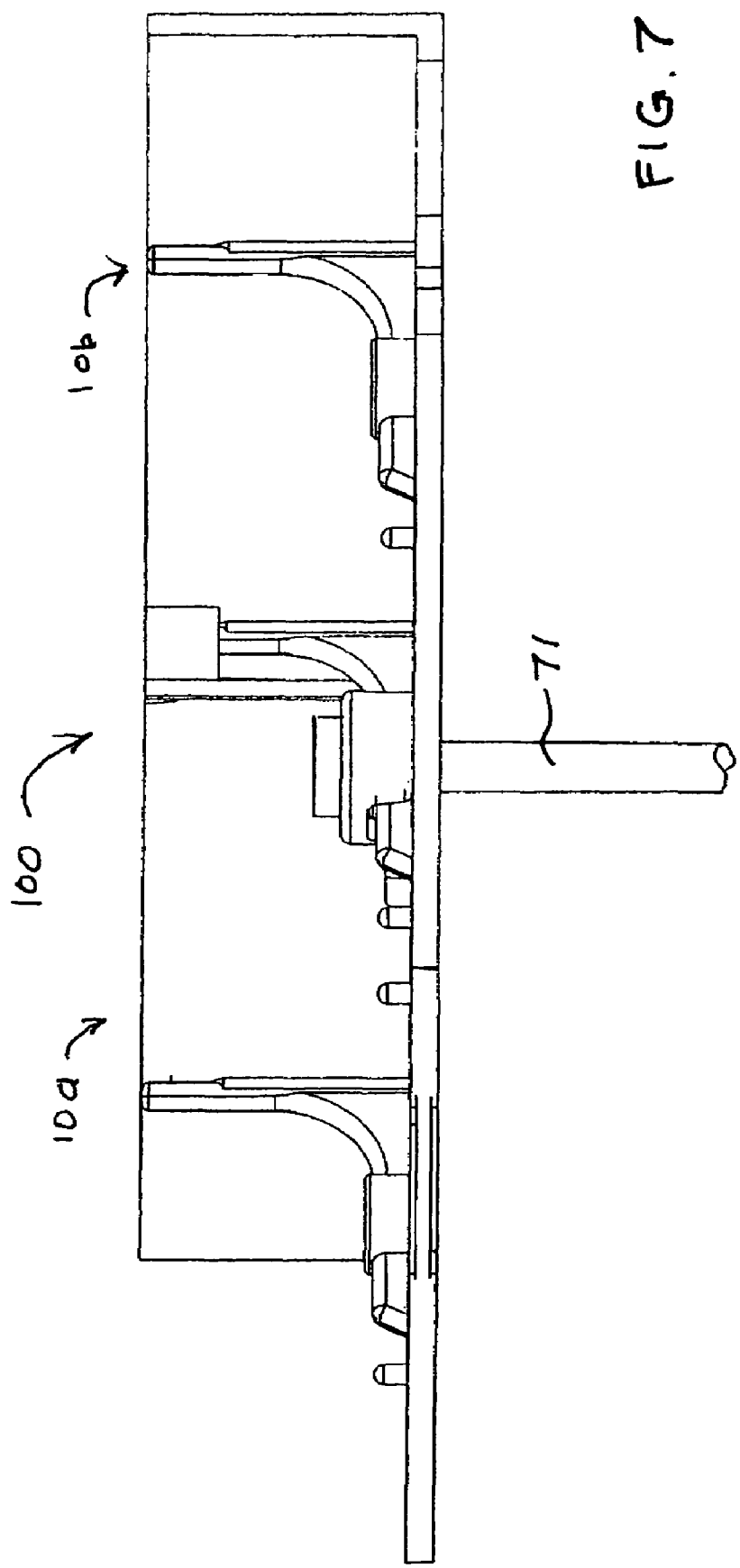

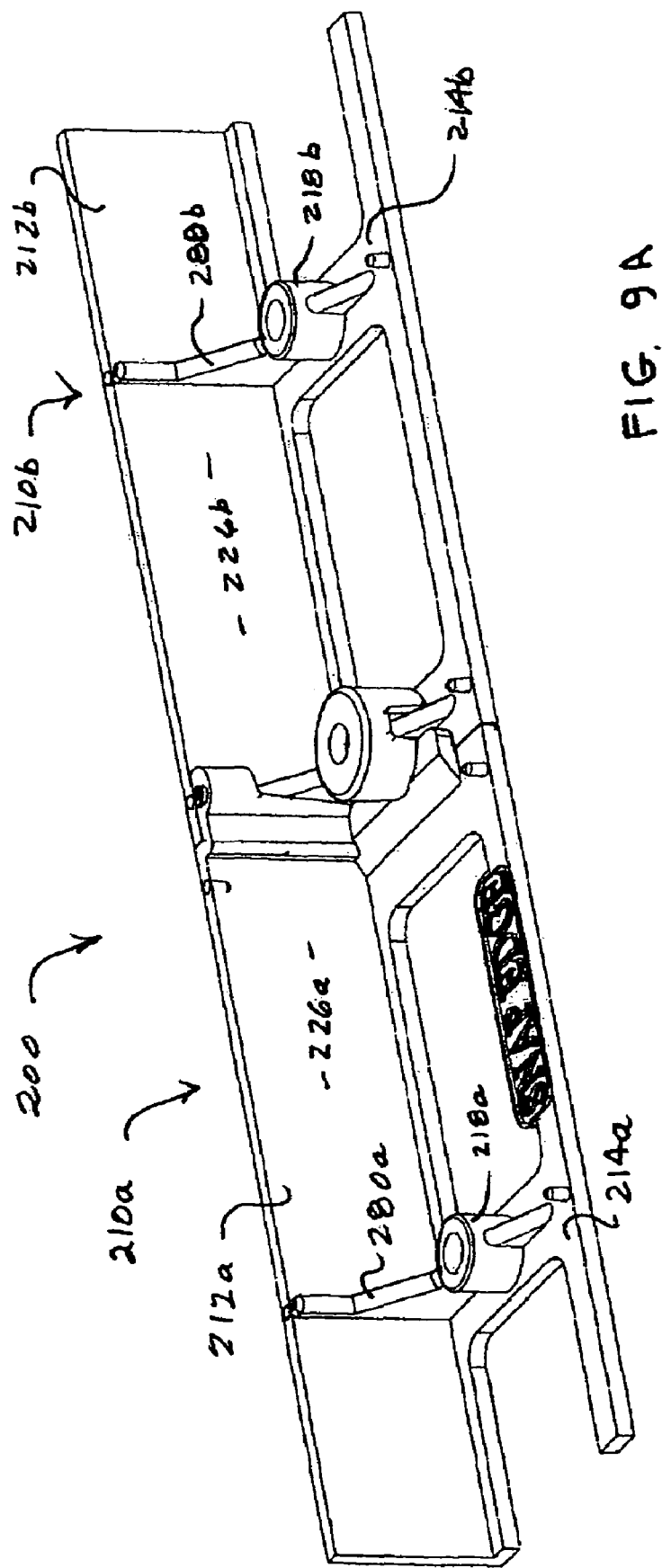

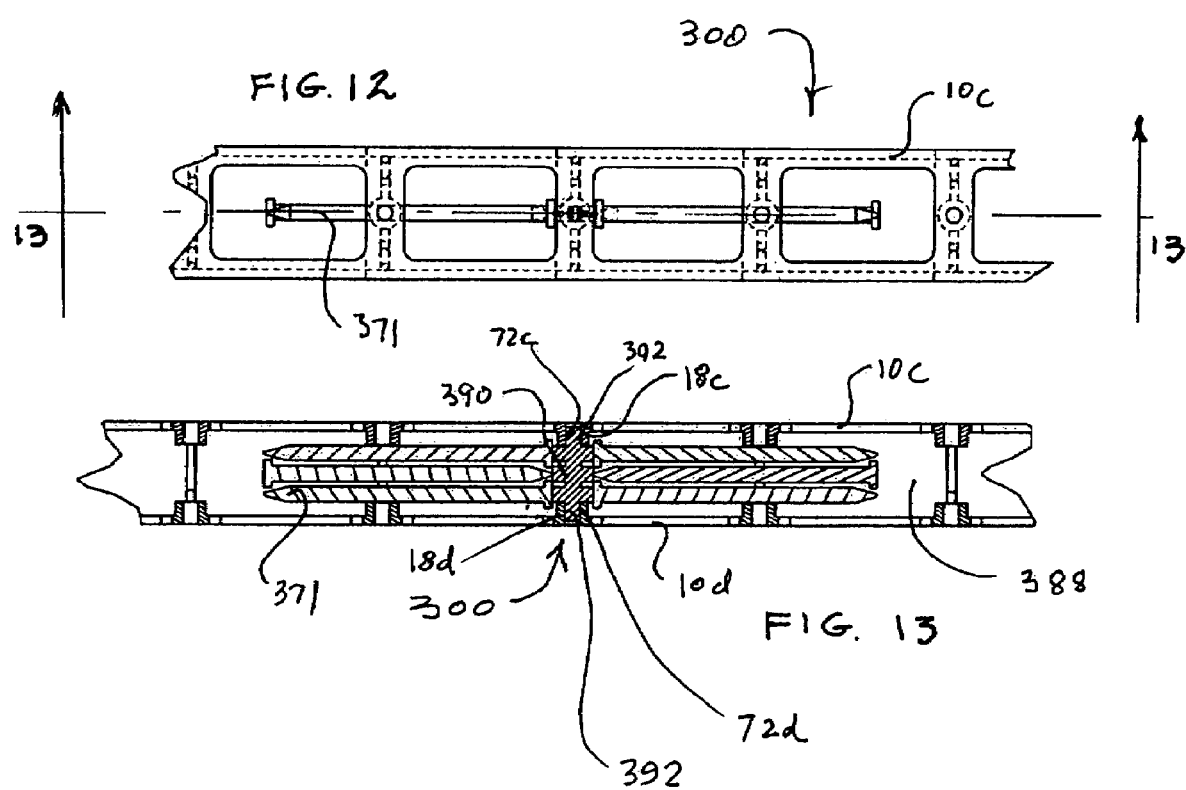

ELONGATED EDGING ASSEMBLY

CROSS REFERENCE TO RELATED APPLICATION

None

BACKGROUND OF THE INVENTION

1. Field of the Invention

This invention relates to elongated edging or holding devices having particular utility for holding landscaping and/or paving materials in place in defined areas. In particular the invention relates to such devices which are flexible and economical to install and which adapt readily to various shapes of areas. Even more particularly the invention relates to a novel connector structure whereby a plurality of the devices may be readily arranged in end-to-end relationship and held securely together in an edge defining array.

2. The Prior Art Background

Elongated landscape retaining or edging strips are elongated barriers installed longitudinally along the surface of the ground such that the barrier is substantially perpendicular to the ground. Such edging strips are used in diverse applications including such things as the retention and/or separation of beds of earth or other landscaping fill (i.e., gravel, decorative rock, bark, dirt, sand, mulch) or the retention and maintenance of paving materials, (i.e., bricks, paving stones, rock, gravel, etc.).

Restraining strips that are secured to the ground for holding paving and landscape materials in place have been used for ages. Many of these prior art devices are difficult to install and sometimes require the digging of trenches for installation. Moreover, such retaining strips, while sometimes bendable in a horizontal plane perpendicular to the ground, often lack the vertical flexibility needed to conform to changes in ground slope while maintaining a perpendicular relationship between the ground surface and the retaining strip barrier. Such inflexibility sometimes necessitates the inclusion of a vertically angled joint to accommodate a significant change in ground slope. And even when such joints are used, the inability of a given strip to conform to changes in ground slope will result in occasional gaps between the ground and the strip. Grass and/or debris can encroach underneath the strip through such gaps. These prior art devices also generally are susceptible to a serious problem of tending to pull up out of the ground, particularly when the ground is subject to heaving by freezing or changes in moisture content. Many of the prior devices consist of relatively complicated assemblies such that the precise alignment and overlap of a relatively large number of segments is unnecessarily complicated, time-consuming, and tedious.

Landscape restraining strips must have sufficient mechanical strength to avoid gross deformation by downward or lateral forces. Such strength is particularly critical when the landscape edging devices are used to retain such things as, for example, the gravel in gravel walkways, because of the tendency of the gravel to shift laterally when it is walked upon. However, flat vertical wall restraining strips of the past that have adequate mechanical strength to withstand this lateral force are generally not sufficiently flexible to allow the same to conform easily to changes in ground slope.

Another problem with prior art edging devices is that for practical reasons the same must be made in smaller lengths and must therefore be connected together usually at the job site. Present day connectors are often deficient and incapable of totally resisting the multitude of forces which are imposed on the devices during installation and use. That is to say, while a given device might be capable of resisting forces or twisting imposed in one direction, the same device might be incapable of resisting forces or twisting imposed in a different direction. This is particularly true when one considers the forces imposed on the connectors used for connecting a plurality of separate lengths of edging together and holding the same in alignment. Accordingly, there has been a long standing need for the provision of edging devices which are readily yet sturdily interconnectable in end-to-end relationship.

Prior art edging devices are shown in U.S. Pat. No. 5,240,343, U.S. Pat. No. 5,375,941, U.S. Pat. No. 6,071,038, Re 33,550, U.S. Pat. No. 6,767,159 and U.S. Pat. No. 6,409,421. The entireties of the disclosures of these enumerated patents are incorporated herein by this specific reference thereto.

SUMMARY OF THE INVENTION

To address certain of the issues and shortcomings of the prior art and to advance the state of the edger art generally, in one important aspect the present invention provides an elongated edging assembly for holding landscaping and/or paving materials and the like in place in a predetermined location The assembly desirably comprises a first elongated edger member including a first elongated upright material retaining plate and a connector located adjacent an end of the first member and a second elongated edger member including a second elongated upright material retaining plate and a connector located adjacent an end of the second member The connectors include respective mating interengageable components located on the plates near the ends thereof. The components are configured and adapted to cooperate to interconnect the members and maintain the ends of the respective plates in substantial abutting relationship with the plates in substantial alignment.

The mating components mentioned above preferably may include a tongue on one of the plates and a complementary tongue receiving groove on another of the plates. Desirably the tongue may be located on a surface of one of the plates. Ideally the tongue and the groove may be elongated and arranged so as to extend upwardly of the plates and the groove may be further arranged so as to extend upwardly for only a portion of the height of the plate at the upper end thereof. In a particularly desirable aspect of the invention, the groove may be defined in a shelf extending away from an end of the plate on which it is mounted and the same may be configured to present a longitudinally extending ridge positioned to project into a longitudinally extending interdependent channel disposed behind the tongue.

In another important aspect the invention may include the provision of an outwardly extending support construct for each member and the connectors may include respective mating, interengageable elements located on the support constructs. Preferably the support constructs may be attached to the plates adjacent lower edges of the latter and the constructs may be configured and arranged so as to extend longitudinally of the plates.

In yet another important aspect of the invention, the members may include a debris excluding shield located at the end of one of the plates. Such shield may appropriately be configured and arranged so as to overlap an adjacent portion of a surface of another plate. Ideally, the shelf defining the groove may be mounted at an outer edge of the shield.

Importantly, the tongue and the groove may be configured and arranged for engagement by longitudinal sliding of the tongue into the groove. Alternatively, the tongue and groove may be configured for engagement by snapping the tongue into the groove.

In another preferred and desirable aspect of the invention, the members may each include an outwardly extending support construct attached to a surface of the corresponding plate. Ideally the support constructs each may comprise a plurality of longitudinally spaced, outwardly extending footing structures. A brace may be provided on each footing structure, and in a particularly preferred form of the invention, the braces may comprise nail bosses. In another desirable form of the invention, each brace may comprise a gusset extending between a surface of the corresponding plate and the nail boss.

Preferably, one of the connector elements on the support constructs may comprise one of the braces and the other of support elements may comprise a bonnet for the brace. In addition, the connector may include a cover for a gusset.

In another very important aspect the invention provides an elongated edging member for holding landscaping and/or paving materials and the like in place in a predetermined location. In accordance with this aspect of the invention, the member may include an elongated upright material retaining plate, a first connector including a first component located on the plate near an end thereof, and a second connector including a second component located on the plate near an opposite end thereof. Preferably the components are configured, adapted and arranged to cooperate such that if the member were to be cut laterally into said two separate longitudinally extending segments, each having a separate plate segment, said connectors would be able to interconnect the segments of the member so that adjacent ends of the respective plate segments are in substantial abutting relationship and in substantial longitudinal alignment.

In yet another important aspect, the invention provides an elongated edging assembly for holding landscaping and/or paving materials and the like in place in a predetermined location which comprises first and second edger members, each of which is desirably made up of an elongated upright material retaining plate and a outwardly extending support construct attached to the plate. The edger members are ideally adapted and arranged for being interconnected in longitudinal alignment with adjacent ends of the respective plates in substantial abutting relationship presenting an abutment seam therebetween. In accordance with this aspect of the invention, the members include a debris excluding shield located at the end of the plate. Such shield may desirably include a first segment disposed and configured to overlap the seam. Suitably the shield may include a second segment disposed in contact with the support construct of another member when the members are in abutting relationship. Ideally, the first segment of the shield may be disposed and configured to overlap part of a surface of the plate of the abutting member and the second segment of the shield may be disposed and configured to overlap part of an upper surface of the support construct of the abutting member. In a particularly preferred form of the invention, the first segment of the shield may be elongated and arranged to extend vertically for essentially the entire height of the plate of the abutting member.

In yet another important aspect the invention provides a neat packet of related objects. In accordance with this important aspect of the invention, the packet may comprise a pair of elongated pieces, each of which has a generally L-shaped transverse cross-sectional configuration. The pieces are desirably configured, arranged, aligned and joined together so as to present a single elongated construct having an open interior and a generally rectangular transverse cross-sectional configuration. The packet further may include at least one accessory item for the pieces and a securing element including at least one mounting projection. The accessory item may be attached to the securing element so as to present a single pack. At least one of the elongated pieces desirably has a mounting hole provided therein and such hole may be positioned so as to open into the interior of the construct. The pack may be suspended within the interior of the packet by mounting the securing element in the interior of the packet with its projection extending into the mounting hole. Preferably the pieces, the securing element and the accessory items may all be formed of molded plastic. Desirably the securing element and the accessory item may be formed as a single molded item. Alternatively the pack may comprise a blister pack containing the accessory item and the mounting projection may be formed as part of or attached to the blister pack.

Ideally, the pieces of the packet may be identical and the same may appropriately be lengths of plastic edging, and said accessory may be a spike for holding at least one of the pieces in position on the ground.

BRIEF DESCRIPTION OF THE DRAWINGS

FIG. 6 is an isometric fragmentary view depicting the underneath areas of the left hand member of FIG. 3;

FIG. 7 is an angular fragmentary elevational view depicting the relationship between the edging assembly of FIG. 3 and a spike for holding the same against the ground;

FIG. 9A is an isometric fragmentary view similar to FIG. 3 but depicting an alternative form of an elongated edging assembly which embodies the concepts and principles of the invention;

FIG. 12 is a fragmentary front plan view showing the packet of related objects of FIG. 10; and FIG. 13 is a cross-sectional view taken along the line 13-13 of FIG. 12.

DETAILED DESCRIPTION OF THE PREFERRED EMBODIMENTS

Figure 1:
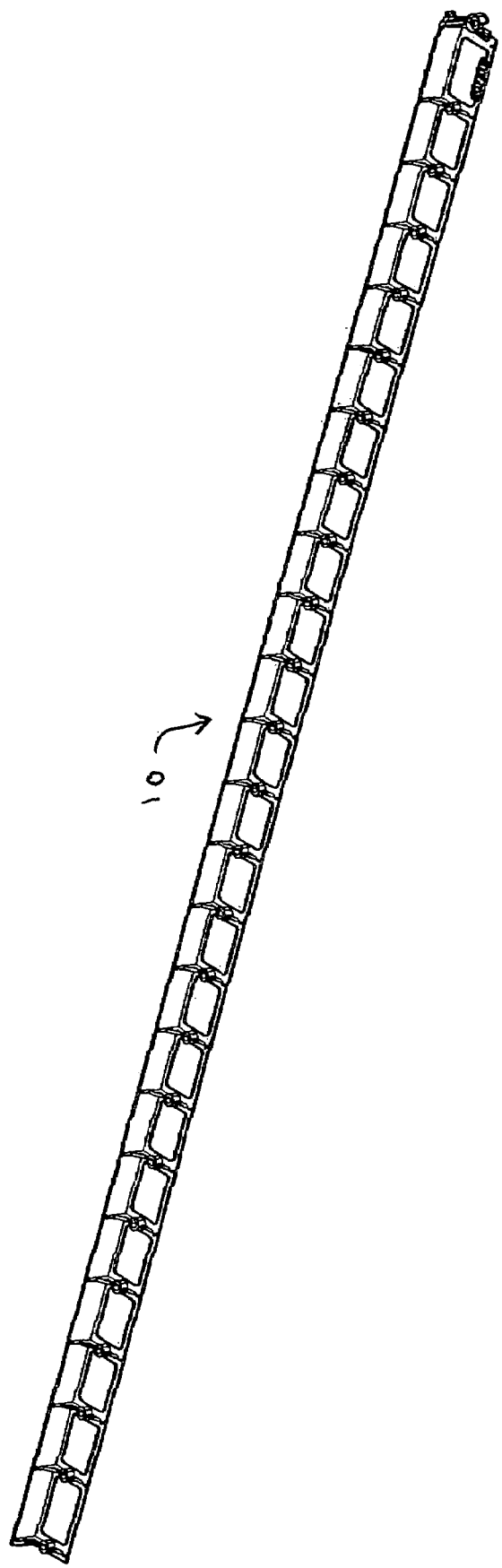
FIG. 1 is an isometric view showing the upper portions of an elongated edger member which embodies the concepts and principles of the invention.
Figure 2:
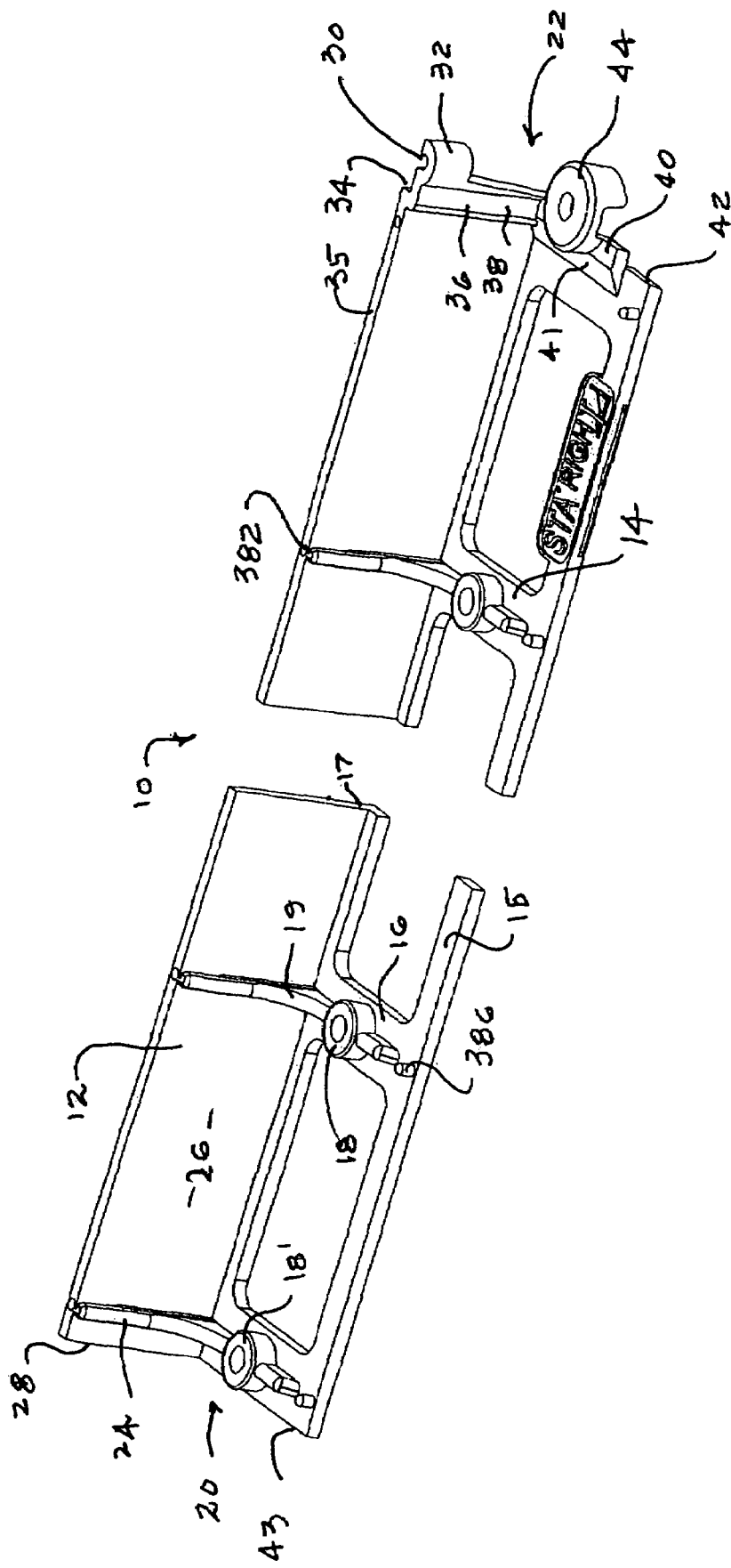
FIG. 2 is an enlarged isometric fragmentary view depicting the upper areas of the elongated edger member of FIG. 1.

An elongated edger member 10 for holding landscaping materials and the like in place in a predetermined location which embodies the concepts and principles of the invention described herein is shown in FIGS. 1 and 2. Commercial embodiments of the member 10 may typically be about 4 feet long; however, the length of member 10 is not a critical feature of the invention. Generally speaking, although again not a critical feature of the invention, member 10 may be formed by injection molding of a thermoplastic material such as polyethylene. In accordance with the invention, member 10, as shown particularly in FIG. 2, ideally may be used for holding landscaping materials and the like in place in a predetermined location. Alternative, more structurally fortified embodiments of the invention described below may desirably be used for holding paving materials such as paving stones or bricks and the like in place in a predetermined location.

With particular reference to FIG. 2, it can be seen that member 10 may include an elongated upright material retaining plate 12 and an outwardly extending support construct designated generally by the reference numeral 14. In use support construct 14 may sit on a ground surface, which ma be prepared in advance if desired, and the same operates to hold upright plate 12 in position for retaining landscaping materials such as mulch and the like in a predetermined position. Support construct 14 generally may be arranged so as to extend longitudinally of plate 10 over essentially the entire length of the latter and the same may desirably be attached to a surface 26 of plate 10 adjacent a lower edge 17 thereof as shown. Desirably, but not necessarily, plate 12 and construct 14 may molded together to present a monolithic structure. In one particularly preferred embodiment, plate 12 may be about 2 inches in height and construct 14 may extend outwardly away from plate 12 and away from surface 26 for about 2½ inches.

Construct 14 may preferably be made up of a series or plurality of longitudinally spaced, outwardly extending footing structures 16, and ideally there may be a brace in the form of a nail boss 18 positioned centrally on each footing structure 16 as shown. As explained in greater detail hereinafter, the nail bosses or braces 18 may be used in conjunction with a spike to secure member 10 to a ground surface. Ribs 19 may desirably but not necessarily be provided as shown particularly in FIG. 2 for added rigidity and aesthetic value. In a particularly preferred embodiment discussed above, footing structures 16 may all be essentially identical and the same may be ¾ inch wide and located on centerlines disposed approximately 4 inches apart. Desirably a severable capping strip 15 may be included for added rigidity during handling and installation.

Member 10 also may include separate and discrete connectors 20, 22 disposed at respective opposite ends thereof. Connector 20 may include a component in the form of an elongated, upwardly extending tongue 24 located on surface 26 of plate 12 near end 28 of the latter. Connector 22 may include a component in the form of an elongated, upwardly extending tongue receiving groove 30 which is complementary to tongue 24. Groove 30 may desirably be defined in a shelf 32 which extends in a longitudinal direction away from an end 34 of plate 12. Preferably, groove 30 extends downwardly from an upper edge 35 of plate 12 for only a short distance, ideally about ½ inch or so. In this latter regard, the groove could extend for essentially the entire height of the plate 12; however, a shorter groove facilitates interconnection of abutting members 10.

As can be seen from FIG. 2, tongue 24 and groove 30 are located on plate 12 near respective opposite ends 28, 34 thereof, and as will become more meaningful in the description which follows, tongue 24 and groove 30 are configured, adapted and arranged to cooperate such that if the member 10 were to be cut laterally into two separate longitudinally extending segments, each having a separate plate segment, tongue 24 and groove 30 would be able to interconnect the separate segments so that adjacent ends of the respective plate segments are in substantial abutting relationship and in substantial longitudinal alignment.

It is to be noted that member 10 also desirably includes a debris excluding shield 36 located at end 34 of plate 12. The purpose and function of shield 36 will be further explained and clarified hereinbelow. Suffice it to say at this point that shield 36 includes an upwardly extending segment 38 that projects longitudinally of member 10 away from end 34 of plate 12 and provides a mounting site for shelf 32 as shown. Moreover, segment 38 of shield 36 is arranged and configured to overlap an adjacent portion of a surface of another plate or plate segment disposed in abutting relationship to plate 12. Shield 36 also includes an outwardly extending segment 40 that projects longitudinally of member 10 away from an end 42 of construct 14. Segment 40 of shield 36 is arranged and configured to overlap an adjacent portion of a surface of another construct or construct segment disposed in abutting relationship to construct 14.

Connector 22 further preferably includes a bonnet 44 which extends longitudinally of member 10 from end 42 of construct 14, and it can be seen that in the preferred embodiment illustrated in FIG. 2, segment 40 provides a mounting site for bonnet 44. Suffice it to say at this point that bonnet 44 and the nail boss 18' at the opposite end 43 of construct 14 are configured, adapted and arranged to cooperate such that if the member 10 were to be cut laterally into two separate longitudinally extending segments, each having a separate construct segment, bonnet 44 and nail boss 18' would be able to interconnect the separate construct segments so that adjacent ends of the respective construct segments are in substantial abutting relationship and in substantial longitudinal alignment. In this regard it is to be appreciated that nail boss 18' is an element which is part of connector 20 and bonnet 44 is an element that is a part of connector 22. Thus, bonnet 44 and nail boss 18' present respective mating interengageable elements located at opposite ends of construct 14. In the preferred embodiment shown in FIG. 2, segment 40 may be provided with a beveled edge 41 to facilitate molding.

With reference to FIGS. 3 through 7, it can be seen that a plurality of members or segments of members 10a, 10b may be joined together so as to present an elongated edging assembly 100 for holding landscaping materials and the like in place in a predetermined location as illustrated particularly in FIG. 7. In this regard, although FIGS. 3 through 5 and 7 show only two segments of two separate members 10a and 10b as being part of the assembly 100, it will be readily understood by those skilled in the art that the system itself may include as many separate complete or segmental members 10 as might be needed to surround or define an area to be landscaped. In this regard it is also to be appreciated that in the illustrated preferred form of the invention, the members 10a and 10b may desirably be identical with each other and with member 10 as illustrated in FIG. 2. For clarity, in the specification which follows, the separate elements and components of members 10a and 10b will be identified with a reference numeral which corresponds with the numbering of FIG. 2 followed by an "a" or "b" as is appropriate for the particular illustration.

Figure 3:
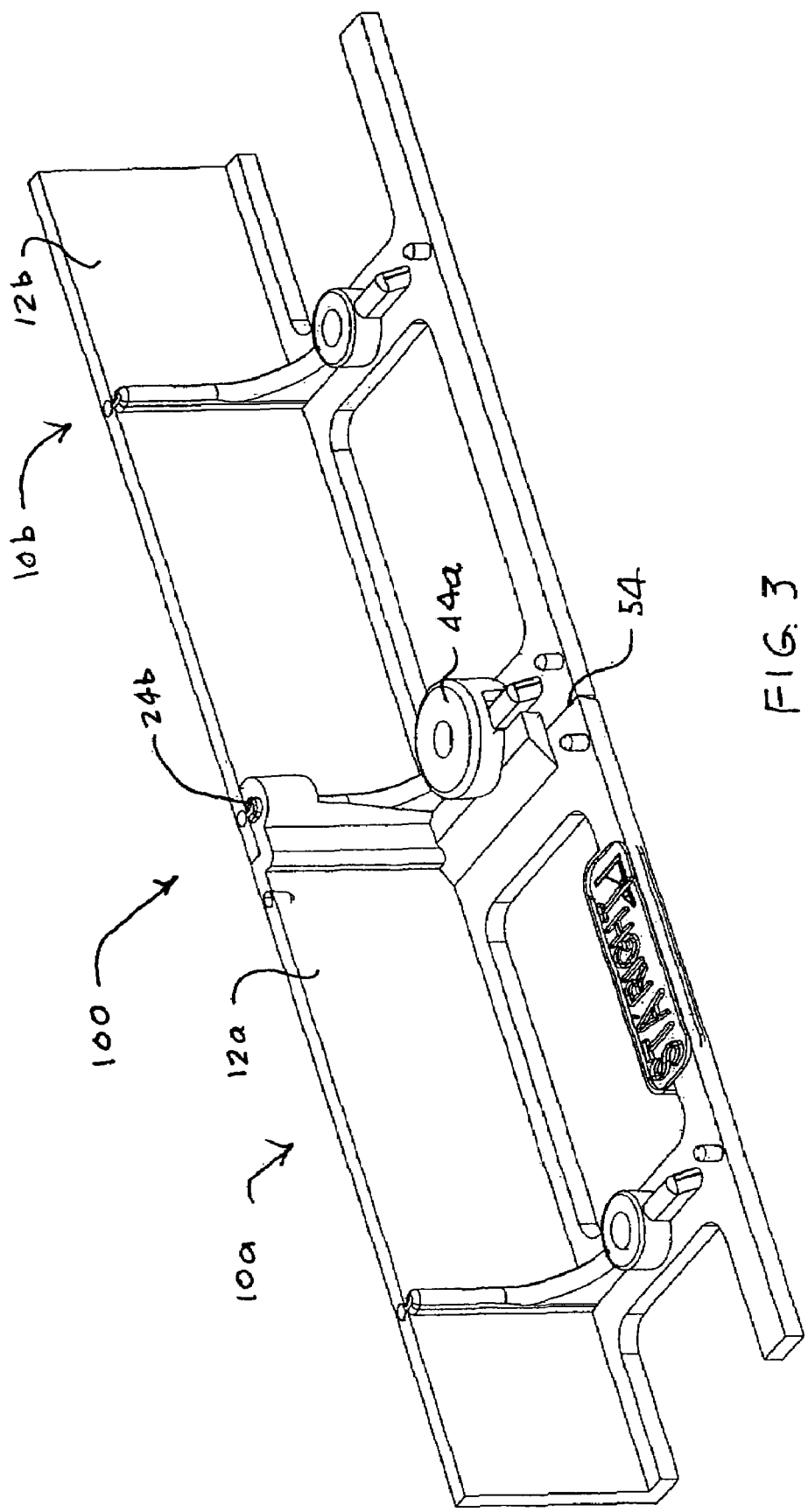
FIG. 3 is an isometric fragmentary view depicting the upper portions of an elongated edging assembly made up of two abutting edging members.
Figure 4:
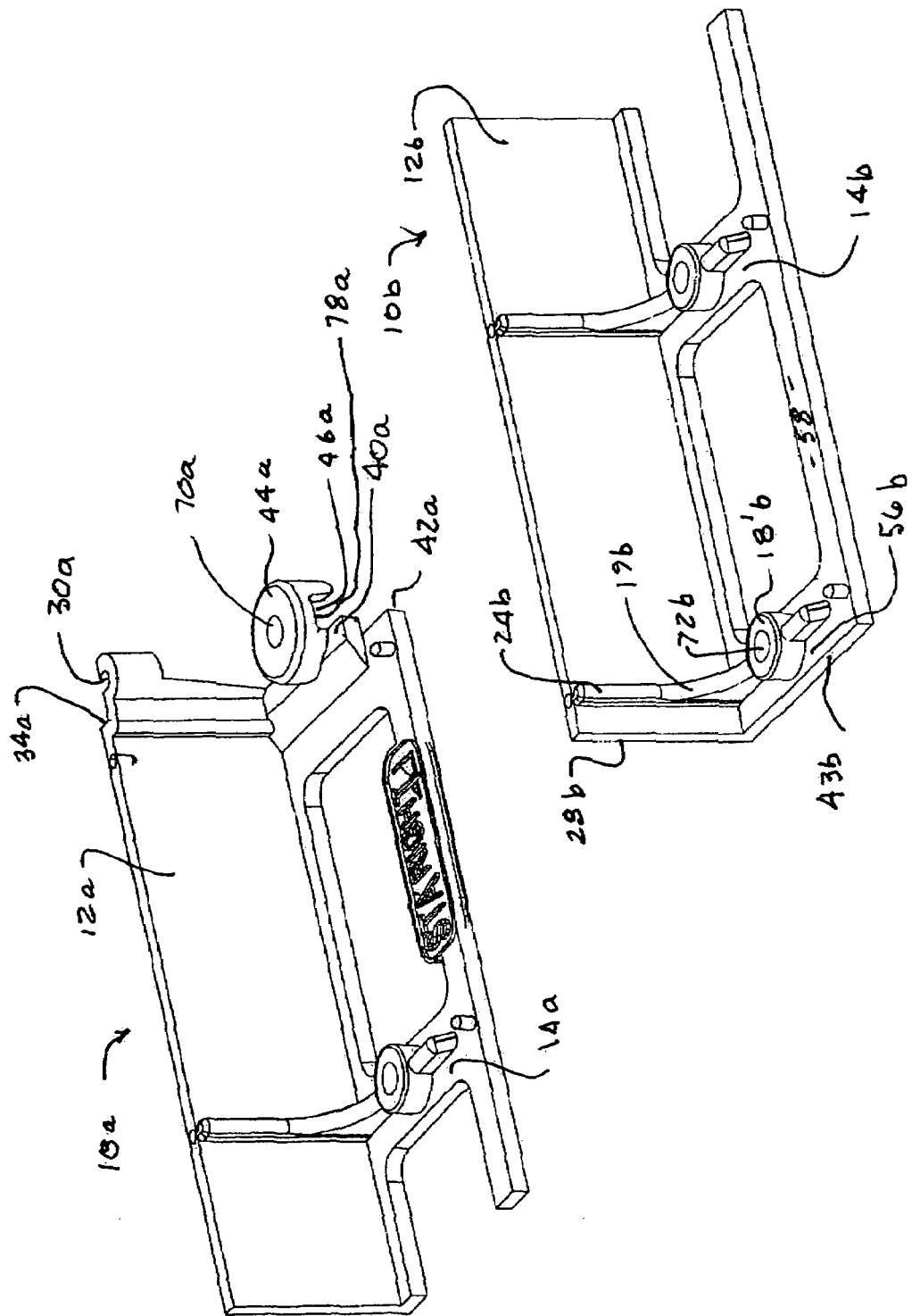
FIG. 4 is an exploded view similar to FIG. 3 but depicting the edging members in a vertically exploded relationship.

As shown in FIGS. 3 and 4, the members 10a and 10b are securely interconnected by virtue of the interengagement of tongue 24b in groove 30a and the interengagement of nail boss 18'b in a socket 46a (best seen in FIG. 6) provided therefor in the underside of bonnet 44a. FIG. 4 is an exploded view of FIG. 3 whereby it is clear that connector components 24b and 30a are interengageable by relative movement of the members 10a and 10b along an upright path of travel. Likewise it is clear that connector components 18'b and 44a are contemporaneously interengageable by relative movement of the members 10a and 10b along the same upright path of travel. That is to say that all connector components of the two adjacent members 10a and 10b are immediately and rigidly connected by a single downward push of member 10a. toward member 10b. Since in the preferred embodiment each individual piece of member 10 has complementary connectors at each end, the individual members and/or segments of the same may continue to be added to the system until the same is complete for a given area to be defined. Thus, the system may preferably includes respective mating interengageable components in the form of groove 30a and tongue 24b located on plates 12a, 12b near ends 28b, 34a thereof, which components are configured and adapted to cooperate to interconnect the members 10a, 10b and maintain ends 28b, 34a of plates 12a, 12b in substantial abutting relationship with plates 12a, 12b in substantial alignment as shown in FIG. 3. The system also may desirably include respective mating interengageable elements in the form of nail boss 18'b and bonnet 44a located on support constructs 14a, 14b near ends 42a, 43b thereof, which elements also are configured and adapted to cooperate to interconnect the members 10a, 10b and maintain ends 42a, 43b of support constructs 14a, 14b in substantial abutting relationship and in substantial alignment, again as shown in FIG. 3. Unlike prior art systems, the invention described herein thus provides a secure connection holding adjacent ends 34a, 28b of abutting upright plates 12a, 12b together. In addition, the invention described herein provides not only a secure connection holding adjacent ends 34a, 28b of abutting upright plates 12a, 12b together but at the same time a secure connection holding adjacent ends 42a, 43b of abutting support constructs 14a, 14b together.

In connection with the foregoing, it is to be appreciated that the footing structure 16b/nail boss 18b combinations desirably may all be identical so that any one of the same might perform the function of the nail boss 18'b. Thus, the member 10b may be cut at any one of a variety of lengths for accommodating any given space requirements.

As described previously, groove 30a and tongue 24b desirably are elongated and extend upwardly of plates 12a, 12b. It is to be noted in this regard that in the preferred embodiment of the invention, groove 30a and tongue 24b are arranged for interengagement by sliding of tongue 24b longitudinally and upwardly into and along groove 30a. On the other hand, as will be appreciated by those of ordinary skill in the art, the tongue and groove could be configured and arranged for lateral snapping of the tongue 24b into the groove 30a.

Figure 5:
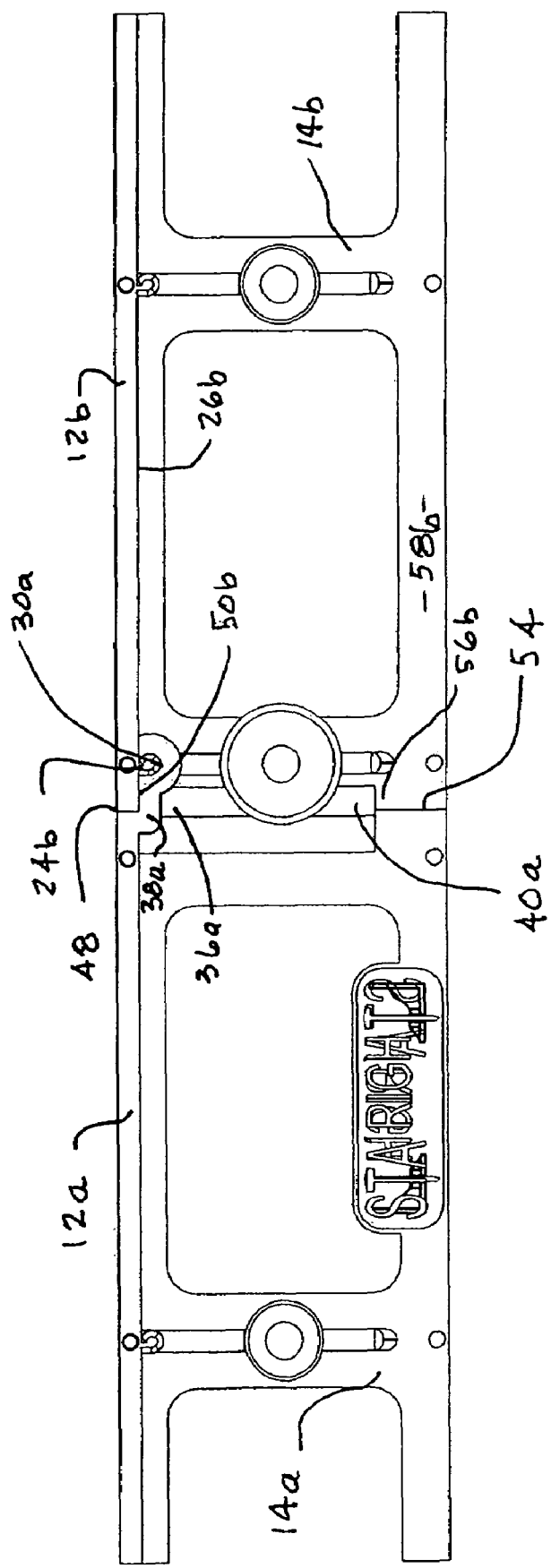
FIG. 5 is a top plan view depicting the assembly of FIG. 3.
Figure 5A:
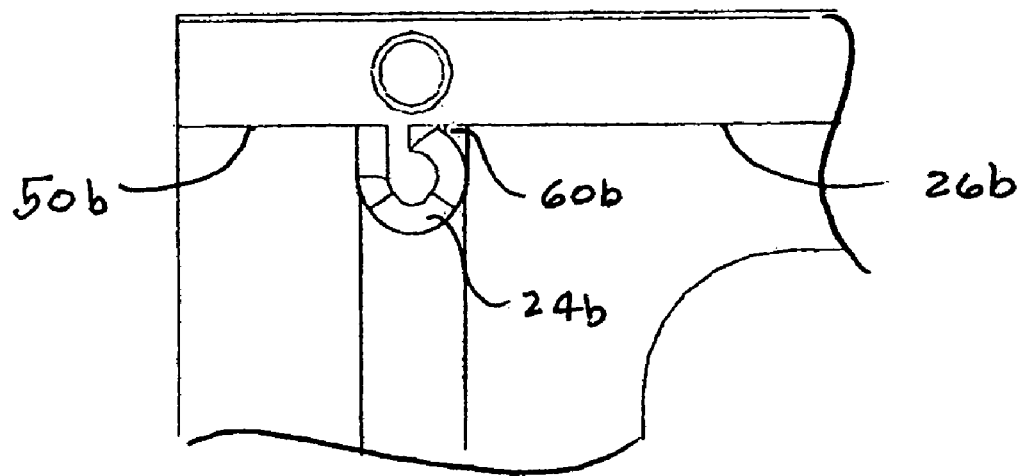
FIG. 5A is an enlarged fragmentary view depicting the tongue component of the connector of FIG. 5.
Figure 5B:
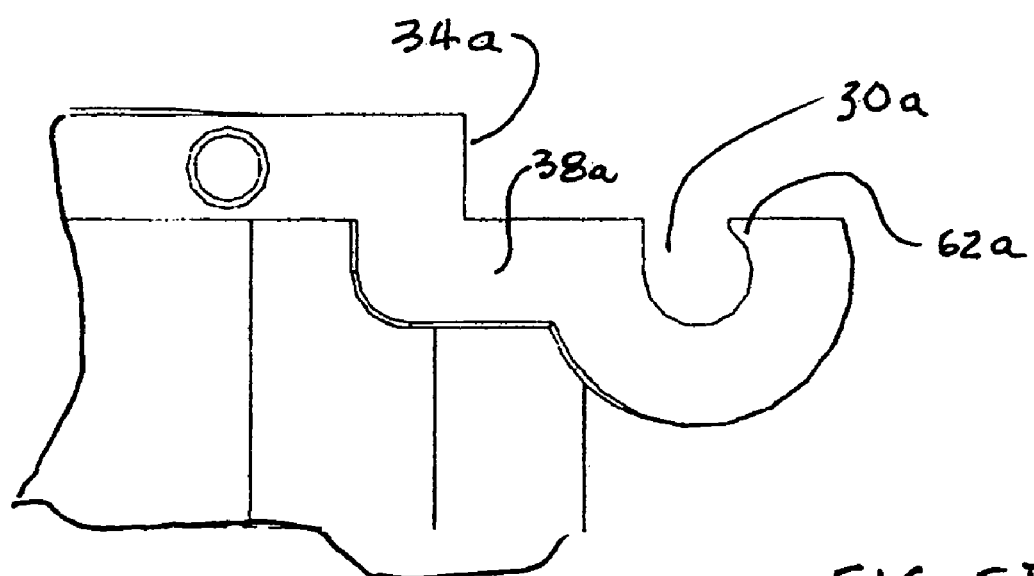
FIG. 5B is an enlarged fragmentary view depicting the groove component of the connector of FIG. 5.

With reference to FIGS. 5, 5A and 5B, it can be seen that groove 30a and tongue 24b desirably and preferably include a special complementary configuration which facilitates a secure interlocking interconnection therebetween. To this end, and with particular reference to FIG. 5A, it can be seen that tongue 24b is configured so as to present a longitudinally extending channel 60b disposed therebehind. And with reference to FIG. 5B, it can be seen that groove 30a is configured so as to include a longitudinally extending ridge 62a positioned to project into channel 60b when tongue 24b and groove 30a are interconnected as shown in FIG. 5. To facilitate a snap fit connection between tongue 24b and groove 30a as mentioned above, ridge 62a may be flexibly configured and arranged and positioned so as to move out of the way while pushing tongue 24b laterally into groove 30a and to snap back into channel 60b when lateral insertion of tongue 24b is complete.

With further reference to FIGS. 5, 5A, 5B, when two separate adjacent members or segments 10a, 10b are interconnected to form a system, an abutment seam 48 is presented between plates 12a, 12b. In prior art systems, such seam undesirably allows debris and the like to move laterally between the abutting plates from one side of the assembly to the other. To avoid such phenomena, the invention provides debris excluding shield 36a described above. Shield 36a includes a segment 38a which desirably is located at end 34a of plate 12a and is arranged and configured to overlap seam 48 as well as an adjacent portion 50b of surface 26b of another plate 12b disposed in abutting relationship to plate 12a. Desirably segment 38a extends vertically for the entire height of the plates 12a, 12b to maximize the debris excluding capabilities of shield 36a. To further maximize the debris excluding capabilities of shield 36a, the same may preferably include a horizontally extending segment 40a which desirably is located at end 42a of support construct 14a and is arranged and configured to overlap horizontal seam 54 as well as an adjacent portion 56b of surface 58b of another support construct 14b disposed in abutting relationship to support construct 14a.

FIG. 6 illustrates the underside of member 10a, which is provided with an angled ramp 64a which facilitates an injection molding process. Shoulders 66a, 68a provide abutment surfaces on opposite sides of the ramp 64a to facilitate assembly and connection of adjacent members 10a, 10b. Without shoulders 66a, 68a, end 42a of member 10a might tend to slide up on top of end 43b of member 10b during assembly or afterwards.

As shown in FIG. 4, bonnet 44a may be provided with a hole 70a and nail boss 18'b may be provided with an hole 72b. When the members 10a, 10b are interconnected as shown in FIG. 3, holes 70a, 72b are aligned, and with reference to FIG. 7, it can be seen that a spike 71 may be inserted through holes 70a, 72b for holding members 10a, 10b together and holding the assembly 100 against the ground.

Figure 8:
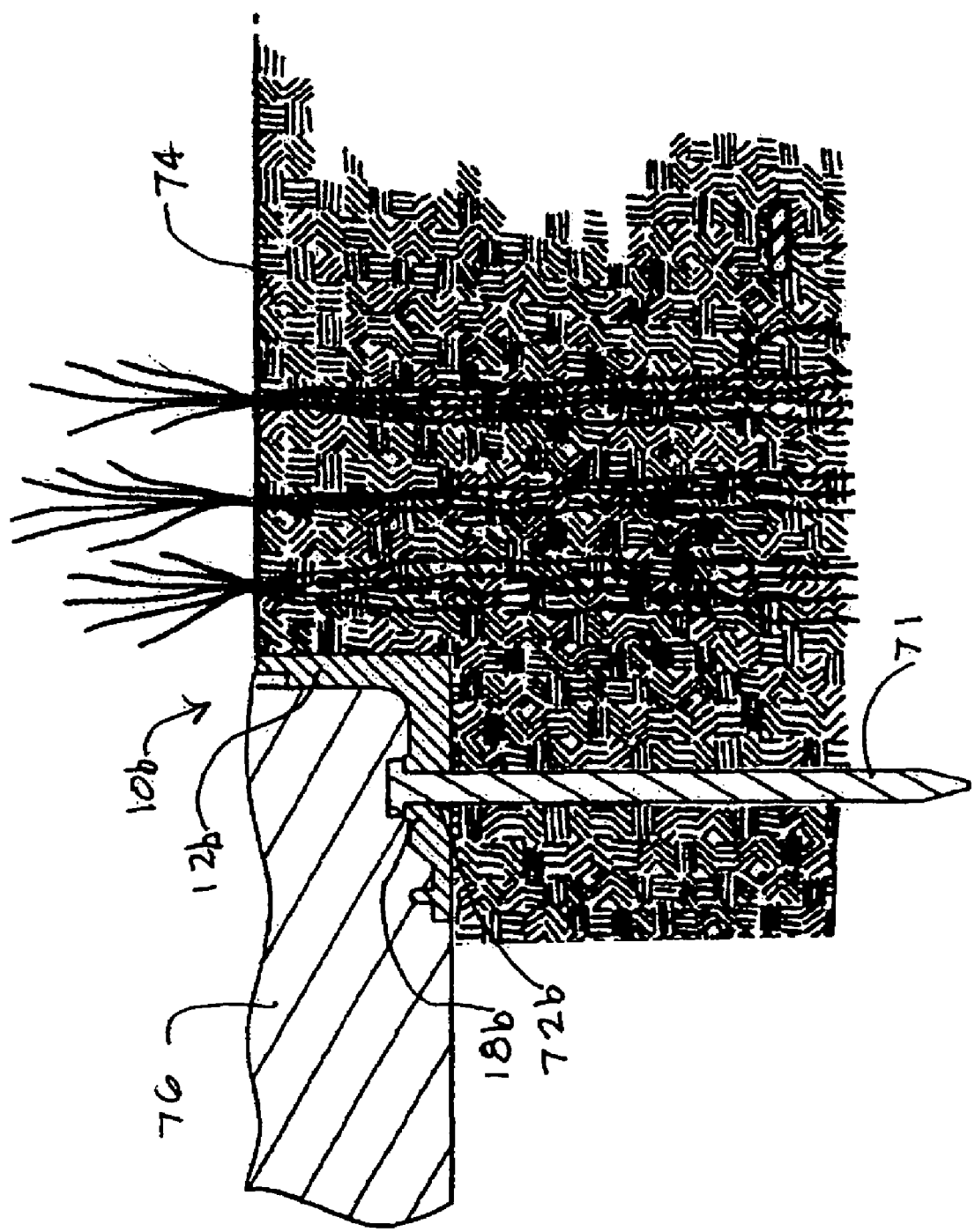
FIG. 8 is a schematic view depicting the manner in which the assembly of FIG. 3 is used to define a landscape installation.

FIG. 8 is a cross-sectional view illustrating a landscaping installation where a series of members 10 (only one is shown) may be used to define a boundary between a grassy area 74 and a landscaped area 76 containing mulch or the like. To install members 10, soil is removed from the area 76 to a depth sufficient to accommodate the height of plate 12. A first member 10b may then be installed in a selected position and secured to the ground using spikes 71b extending through one or more of the holes 72b in the nail bosses 18b of the member 10b. Starting from a position above first member 10b (See FIG. 4), second member 10a may be moved downwardly while tongue 24b slides into groove 30a. The downward movement of member 10a continues until nail boss 18'b of member 10b is encompassed and surrounded by the socket 46a of bonnet 44a of member 10a. A spike 71 may then be inserted through holes 70a, 72b as shown in FIG. 7 for holding members 10a, 10b together and holding the assembly 100 consisting of members 10a and 10b against the ground. It is to be noted here that bonnet 44a may be provided with opposed, generally U-shaped openings 78a positioned to accommodate ribs 19b if the latter have been included as part of the member 10b in a given installation.

FIG. 9A illustrates an embodiment of the invention which is of particular value in connection with paving installations.

FIG. 9A, which is similar to FIG. 3, illustrates an elongated edging assembly 200 of particular value for holding paving materials such as paving stones or bricks which are exposed to foot or vehicular traffic in a predetermined location. In this embodiment, the support constructs 214a, 214b may extend outwardly for a distance of as much as 4 inches from plates 212a, 212b, and the latter may be 2½. to 3 inches in vertical height. Support constructs 214a, 214b may be thicker than support constructs 14a, 14b of FIG. 3 so as to help resist the additional loads imposed thereon by traffic, etc. In addition, the members 210a, 210b may include gussets 280a, 280b in place of ribs 19a, 19b of elongated edging assembly 100 of FIG. 3. The gussets 280a, 280b extend between surfaces 226a, 226b of plates 212a, 212b and the nail bosses 218a, 218b. Otherwise, elongated edging assembly 200 of FIG. 9A may be essentially of the same general configuration as assembly 100 of FIG. 3. For commercial applications, each member 210a, 210b, etc. of the assembly 200 may desirably be 6 to 8 feet in length.

Figure 9B:
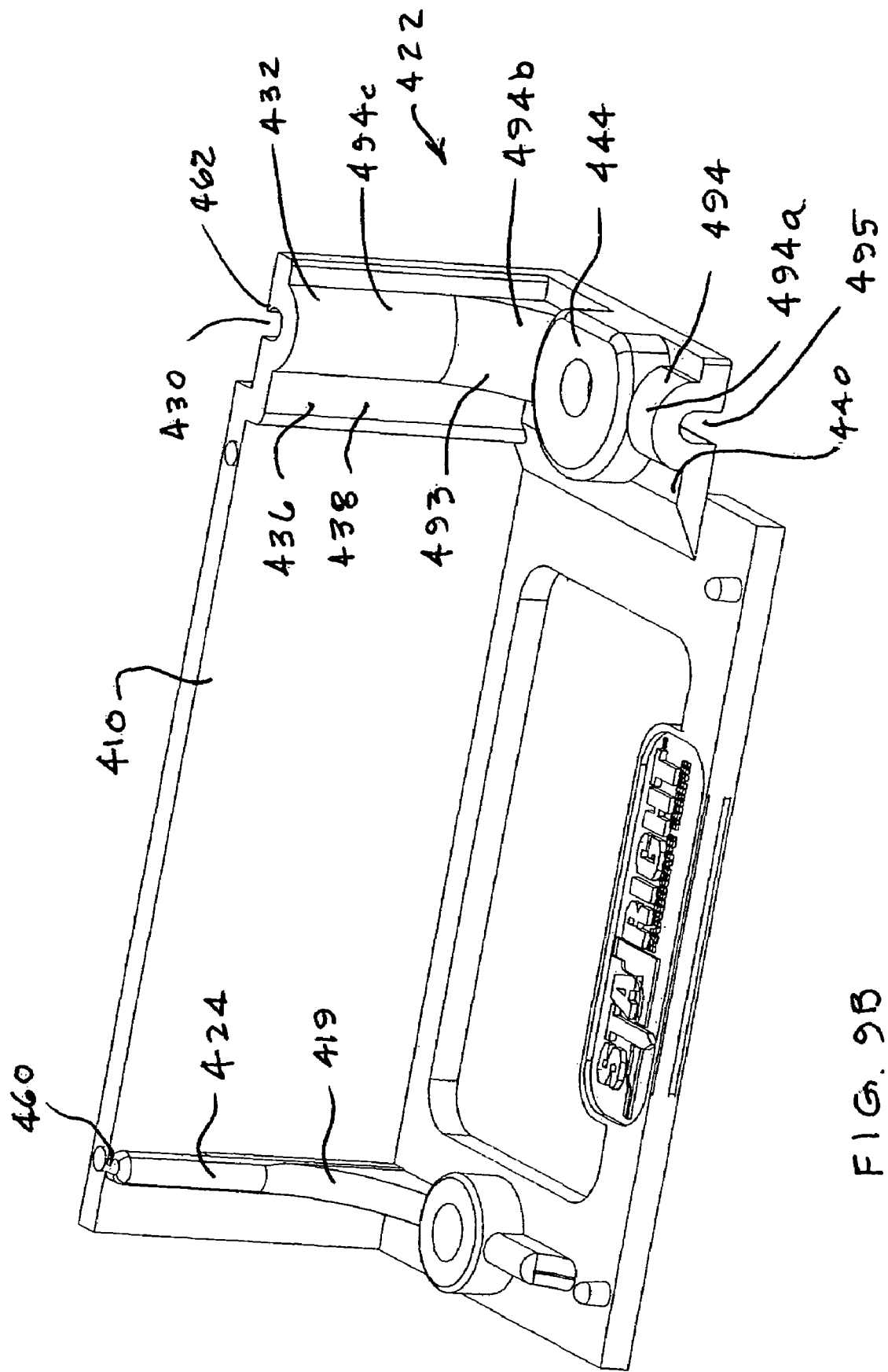
FIG. 9B is an isometric fragmentary view illustrating an alternative form of an elongated edger member similar to the member of FIG. 2 and which embodies the concepts and principles of the invention.

FIG. 9B illustrates an embodiment of the invention which is essentially the same as the embodiment of FIG. 2 except that in this case the connector 422 of member 410 includes a cover 493 for the rib 419. To this end cover 493 extends longitudinally and outwardly of member 410 from segments 438, 440 of shield 436 as shown. Cover 493 desirably extends away from bonnet 444 on opposite sides thereof and presents a tunnel member 494 that includes an outboard portion 494a, an inboard arcuate portion 494b and a vertically extending portion 494c. The upper section 432 of portion 494c ideally replaces and performs the same function as shelf 32 of FIG. 2. Tunnel member 494 presents and defines a tunnel 495 which first extends horizontally through portion 494a, then bends in portion 494b, and extends upwardly through portion 494c. Tunnel 495 has an interior configuration which is complementary to the outer shapes of rib 419 and tongue 424 so as to provide a snug and secure fitting when adjacent members are interconnected to form an assembly. The upper portion of tunnel 495 presents and defines a groove 430 which interconnects with tongue 424 to serve essentially the same purpose as groove 30 of FIG. 2. Desirably in this embodiment the groove 430 includes a ridge 462 and the tongue 424 presents a channel 460 which are essentially the same as and provide the same respective functions as the ridge 62a and channel 60b of FIGS. 5A and 5B.

Figure 9C:
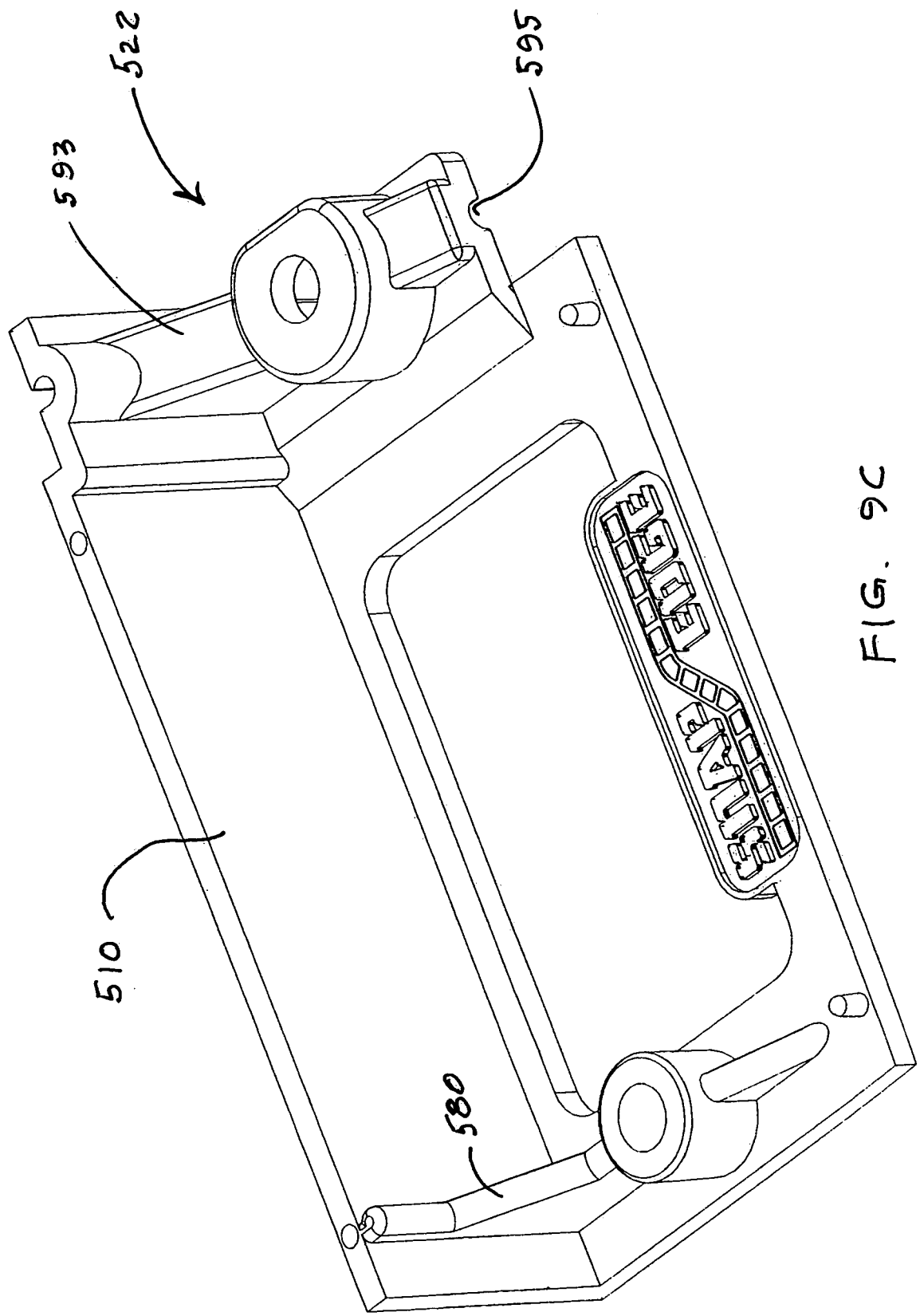
FIG. 9C is an isometric fragmentary view illustrating another alternative form of an elongated edger member similar to a member of the assembly of FIG. 9A and which embodies the concepts and principles of the invention.
Figure 10:
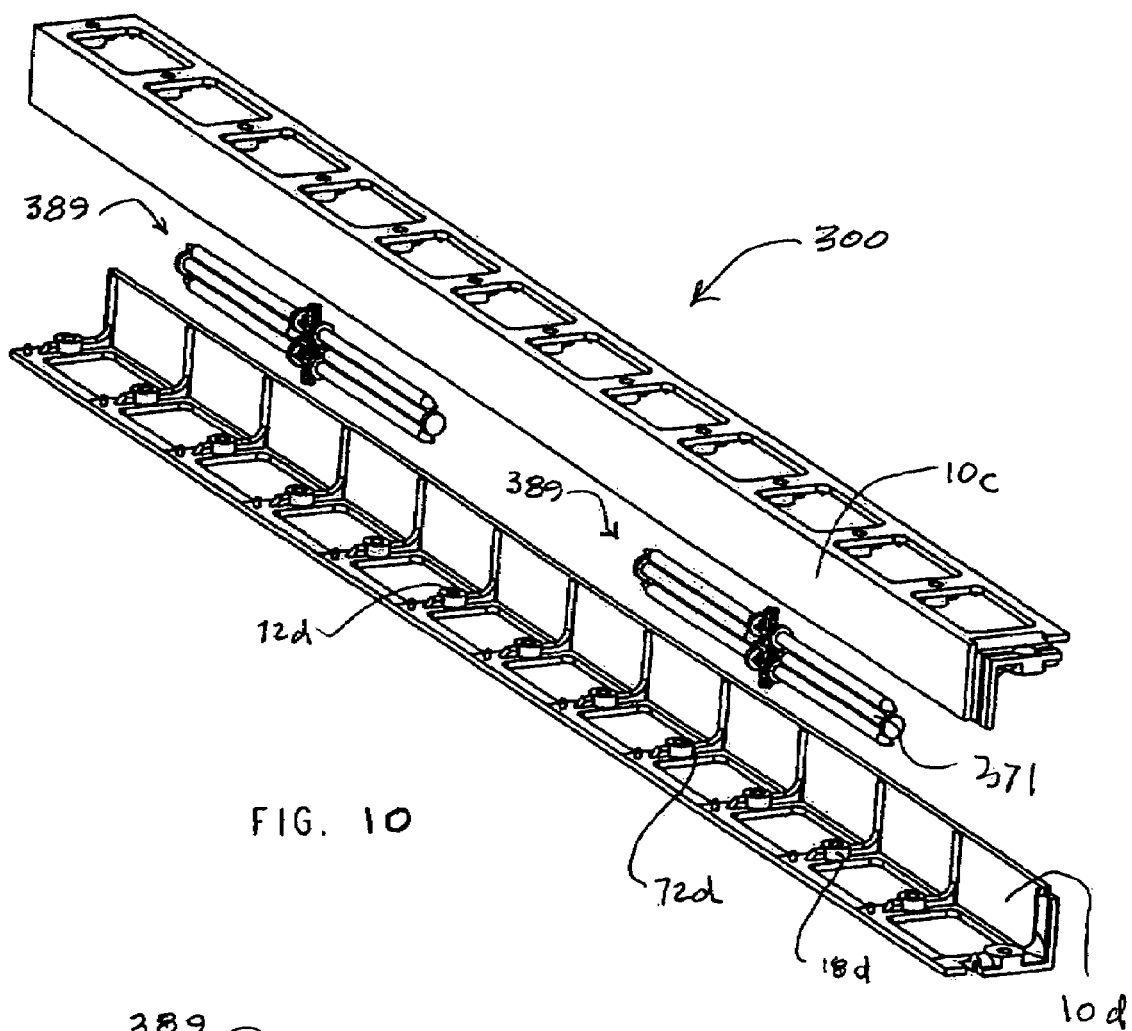
FIG. 10 is an exploded isometric view depicting a packet of related objects which embodies the concepts and principles of the invention.
Figure 11:
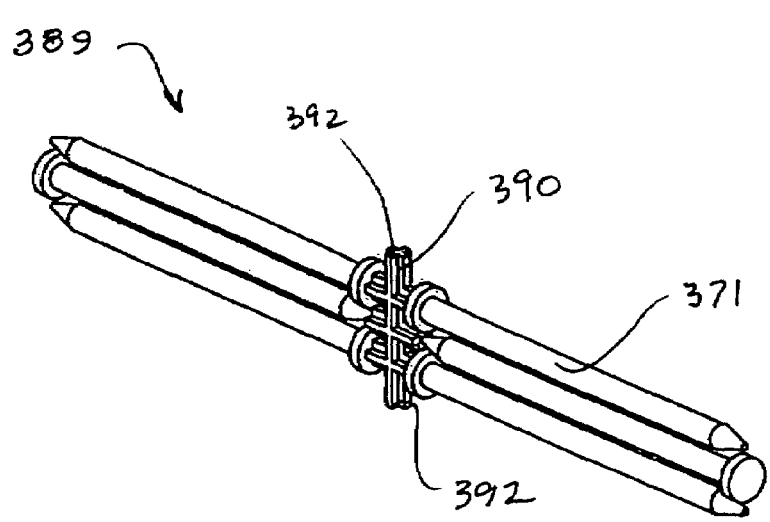
FIG. 11 is and an enlarged isometric view depicting the packet of accessories of FIG. 10.

FIG. 9C illustrates an embodiment of the invention which is essentially the same as the embodiment of FIG. 9A except that in this case the connector 522 of member 510 includes a cover 593 for the gusset 580 and the interior of the tunnel 595 is configured to complement the exterior surfaces of gusset 580.

Another important aspect of the invention is illustrated in FIGS. 10 through 13. This aspect of the invention provides a neat packet 300 of related objects. Generally speaking the related objects may be two of the elongated members 10 of FIG. 2 and several of the spikes 71 of FIGS. 7 and 8. In this regard it is to be noted (See FIG. 2) that elongated members 10 may be provided with a series of downwardly extending holes 382 in upper edge 35 of plate 12. In addition, the members 10 may be provided with a series of upstanding pegs 386 located atop capping strip 15 of support construct 14. These holes 382 and pegs 386 are positioned so that when two separate members 10c, 10d are brought together to form the packet 300 as shown in FIGS. 12 and 13, there will be a hole 382 for each peg 386 and vice versa. The members 10c, 10d are each essentially L-shaped in transverse cross-sectional configuration, and the packet 300 created by bringing the same together has a generally rectangular transverse cross-sectional configuration. Thus, the members 10c, 10d are configured, arranged, aligned and joined together so as to present a single, elongated construct having an open interior 388.

The packet 300 desirably may include one or more accessory items for the members 10c, 10d. Ideally, these accessory items may comprise one or more of the spikes 371 which may be part of a pack 389 that includes a securing element in the form of a spider element 390 provided with opposed mounting projections 392. Desirably the spikes 371 and the spider element 390 may be molded together as a single item (See FIG. 11). As discussed above, members 10c, 10d, which may desirably be identical with the members 10 and with each other, may include holes 72c, 72d provided in nail bosses 18c, 18d. These holes 72c, 72d are positioned so as to open into the interior 388 of the packet 300. The spider element 390 with the attached spikes 371 may then desirably be mounted within open interior 388 with the projections 392 positioned within the holes 72c, 72d.

In another embodiment of the invention, the pack 389 may include a securing element in the form of a blister pack containing the nails which may desirably be made of steel. In this embodiment of the invention the mounting projections 392 may be formed as part of or as an attachment to the blister pack.

We claim

1. An elongated edging assembly for holding landscaping and/or paving materials in place in a predetermined location, said assembly comprising:
   a first elongated edger member including a first elongated upright material retaining plate and a first connector located adjacent an end of the first plate; and
   a second elongated edger member including a second elongated upright material retaining plate and a second connector located adjacent an end of the second plate,
   said plates each having a material engaging front surface and a rear surface,
   said connectors including respective mating interengageable components,
   said component of the first connector being mounted on one of said surfaces of the first plate so as to extend laterally outwardly therefrom,
   said component of the second connector being mounted on a shelf extending longitudinally of the second plate in a position to overlap said component of the first connector,
   said components being cooperable for rigidly interconnecting said members to prevent relative movement of the latter and maintain said ends of the respective plates in substantial abutting relationship,
   wherein said members each include a outwardly extending support construct, said connectors including respective mating, interengageable elements located on said support constructs,
   wherein said support constructs each comprise a plurality of longitudinally spaced, outwardly extending footing structures,
   wherein said support constructs each include a brace on each footing structure,
   wherein each of said braces comprises a nail boss, and
   wherein one of said elements is one of said braces and the other of said elements comprises a bonnet for said one of said braces.

2. An assembly as set forth in claim 1, wherein each of said braces comprises a gusset extending between a surface of the corresponding plate and the nail boss.

3. An assembly as set forth in claim 2, wherein the other of said elements comprises a cover for its corresponding gusset.

4. An assembly as set forth in claim 1, wherein each of said constructs comprises a rib extending between a surface of the corresponding plate and the nail boss.

5. An assembly for holding landscaping and/or paving materials in place in a predetermined location, said assembly comprising:
first and second elongated edger members configured and adapted for arrangement in longitudinal alignment with an end of the first member in substantial abutment with an end of the second member,
said first member including a first elongated upright plate having a first material retaining front surface and a first rear surface, a first support construct extending rearwardly away from a lower portion of said first rear surface, and a first connector located adjacent said end of the first member, said first connector comprising a connector component carried by said first plate and a connector component carried by said first support construct,
said second member including a second elongated upright plate having a second material retaining front surface and a second rear surface, a second support construct extending rearwardly away from a lower portion of said second rear surface, and a second connector located adjacent said end of the second member, said second connector comprising a connector component carried by said second plate and a connector component carried by said second support construct,
said connector components of the plates being interengageable, mating and cooperable for interconnecting said plates and holding said front surfaces in abutting aligned relationship,
said connector components of the support constructs being interengageable, mating and cooperable for interconnecting said constructs,
said components being cooperable for rigidly interconnecting said members to prevent relative movement of the latter and maintain said ends of the respective plates in said substantial abutting relationship,
wherein said connector component carried by the first plate and said connector component carried by the second plate are interengageable by relative movement of the members along an upright path of travel, and
wherein said connector component carried by the first support construct and said connector component carried by the second support construct are also interengageable by relative movement of the members along said upright path of travel.

6. An assembly as set forth in claim 5, wherein one of said connector components carried by a plate comprises a tongue and the other of said connector components carried by a plate comprises a complementary tongue receiving groove.

7. An assembly as set forth in claim 6, wherein said connector component carried by the first plate comprises a tongue and the connector component carried by the second plate comprises a groove.

8. An assembly as set forth in 6, wherein said tongue and said groove are elongated and extend upwardly of said plates.

9. An assembly as set forth in 7, wherein said tongue and said groove are elongated and extend upwardly of said plates.

10. An assembly as set forth in claim 6, wherein said tongue and said groove are elongated, and said groove is configured to present a longitudinally extending ridge positioned to project into a longitudinally extending interdependent channel disposed behind said tongue.

11. An assembly as set forth in claim 8, wherein said groove extends upwardly for only a portion of the height of the plate.

12. An assembly as set forth in claim 9, wherein said groove extends upwardly for only a portion of the height of the plate.

13. An assembly as set forth in claim 12, wherein said groove is positioned at an upper portion of the plate.

14. An assembly as set forth in claim 8, wherein said tongue and said groove are configured and arranged for interengagement by relative movement of the members in a direction to cause longitudinal sliding of the tongue into the groove.

15. An assembly as set forth in claim 9, wherein said tongue and said groove are configured and arranged for interengagement by relative movement of the members in a direction to cause longitudinal sliding of the tongue into the groove.

16. An assembly as set forth in claim 5 wherein said connector component carried by said second plate is mounted on a shelf extending longitudinally of the second plate in a position to overlap said connector component carried by said second plate, and wherein said shelf extends over an adjacent portion of the rear surface of the first plate to present a debris excluding shield covering the abutting ends of the plates.

17. An assembly as set forth in claim 5, wherein said support constructs each comprise a plurality of longitudinally spaced, outwardly extending footing structures.

18. An assembly as set forth in claim 17, wherein said support constructs each include a brace on each footing structure.

19. An assembly as set forth in claim 18, wherein said braces comprise nail bosses.

20. An assembly as set forth in claim 19, wherein said braces comprise a gusset extending between a surface of the corresponding plate and the nail boss.

21. An assembly as set forth in claim 18, wherein one of said connector components carried by a support construct is a brace and the other of said connector components carried by a support construct comprises a bonnet for said brace.

22. An assembly as set forth in claim 19, wherein one of said connector components carried by a support construct is a said nail boss and the other of said connector components carried by a support construct comprises a bonnet for a said nail boss.

23. An assembly as set forth in claim 22, wherein the other of said connector components carried by a support construct comprises a cover for its corresponding gusset.

24. An assembly as set forth in claim 14, wherein said support constructs each comprise a plurality of longitudinally spaced, outwardly extending footing structures.

25. An assembly as set forth in claim 24, wherein said support constructs each include a brace on each footing structure, and wherein said braces each comprise a nail boss.

26. An assembly as set forth in claim 25, wherein one of said connector components carried by a support construct is a said nail boss and the other of said connector components carried by a support construct comprises a bonnet for a said nail boss.

27. An assembly as set forth in claim 26, wherein said bonnet and said nail boss are configured and arranged for nested interengagement by relative movement of the members in said direction.

28. An assembly as set forth in claim 15, wherein said support constructs each comprise a plurality of longitudinally spaced, outwardly extending footing structures.

29. An assembly as set forth in claim 28, wherein said support constructs each include a brace on each footing structure, and wherein said braces each comprise a nail boss.

30. An assembly as set forth in claim 29, wherein one of said connector components carried by a support construct is a said nail boss and the other of said connector components carried by a support construct comprises a bonnet for a said nail boss.

31. An assembly as set forth in claim 30, wherein said bonnet and said nail boss are configured and arranged for nested interengagement by relative movement of the members in said direction.

\* \* \* \* \*